(12) United States Patent
Wells et al.

(10) Patent No.: US 10,432,486 B2
(45) Date of Patent: Oct. 1, 2019

(54) SYSTEM AND METHOD FOR UPDATING APPLICATION CLIENTS USING A PLURALITY OF CONTENT DELIVERY NETWORKS

(71) Applicant: MZ IP Holdings, LLC, Palo Alto, CA (US)

(72) Inventors: Thomas Wells, Mountain View, CA (US); Vincenzo Alagna, Mountain View, CA (US)

(73) Assignee: MZ IP Holdings, LLC, Palo Alto, CA (US)

(*) Notice: Subject to any disclaimer, the term of this patent is extended or adjusted under 35 U.S.C. 154(b) by 0 days.

(21) Appl. No.: 15/798,467

(22) Filed: Oct. 31, 2017

(65) Prior Publication Data

US 2018/0198694 A1    Jul. 12, 2018

Related U.S. Application Data

(60) Provisional application No. 62/443,352, filed on Jan. 6, 2017.

(51) Int. Cl.
*G06F 15/173* (2006.01)
*H04L 12/26* (2006.01)
*H04L 12/24* (2006.01)
*H04L 29/08* (2006.01)

(52) U.S. Cl.
CPC .......... *H04L 43/08* (2013.01); *H04L 41/147* (2013.01); *H04L 67/1008* (2013.01); *H04L 67/1021* (2013.01); *H04L 67/1023* (2013.01); *H04L 43/062* (2013.01); *H04L 43/065* (2013.01)

(58) Field of Classification Search
CPC .................................................. H04L 41/147
USPC ........................................................ 709/224
See application file for complete search history.

(56) References Cited

U.S. PATENT DOCUMENTS

| | | | | |
|---|---|---|---|---|
| 8,738,766 | B1* | 5/2014 | Kazerani | H04L 45/70 709/224 |
| 8,874,725 | B1* | 10/2014 | Ganjam | H04L 43/0817 709/224 |
| 9,787,745 | B1* | 10/2017 | Binns | H04L 65/602 |
| 2002/0095400 | A1* | 7/2002 | Johnson | H04L 41/147 |
| 2006/0136578 | A1* | 6/2006 | Covell | H04L 43/0829 709/223 |
| 2009/0122697 | A1* | 5/2009 | Madhyasha | H04L 41/12 370/229 |

(Continued)

OTHER PUBLICATIONS

Int'l Search Report and Written Opinion of the ISA/EP in PCT/US2018/012041; dated Apr. 23, 2018; 12 pgs.

*Primary Examiner* — Hee Soo Kim
(74) *Attorney, Agent, or Firm* — Goodwin Procter LLP (57) ABSTRACT

Methods, systems, and apparatus, including computer programs encoded on a computer storage medium, are described for identifying optimal content delivery networks for client devices. An example method includes: collecting performance information from each of a plurality of content delivery networks by each of a plurality of client devices; reporting the collected performance information by each of the plurality of client devices; and based on the collected performance information, mapping each client device to an optimal one of the plurality of content delivery networks to use for data transfer between the client device and the corresponding mapped content delivery network.

18 Claims, 3 Drawing Sheets

(56) References Cited

U.S. PATENT DOCUMENTS

2014/0164584 A1\* 6/2014 Joe ..................... H04L 61/1511
709/223
2017/0359242 A1\* 12/2017 Zavesky ............... H04L 41/142

\* cited by examiner

SYSTEM AND METHOD FOR UPDATING APPLICATION CLIENTS USING A PLURALITY OF CONTENT DELIVERY NETWORKS

CROSS-REFERENCE TO RELATED APPLICATIONS

This application claims the benefit of U.S. Provisional Application No. 62/443,352, filed Jan. 6, 2017, the entire contents of which are incorporated by reference herein.

BACKGROUND

This specification relates to content delivery networks and, in particular, to a system and method for identifying optimal content delivery networks for providing content to client devices.

Content Delivery Networks (CDNs) are frequently used to distribute content, such as images, videos, documents, and software, to client devices of end users. A CDN is typically a large system of servers or nodes distributed around the world that provide the content through a network connection (e.g., the Internet). In general, CDNs allow content to be distributed to end users quickly and reliably, without requiring content developers or providers to make significant investments in new hardware or infrastructure.

In some instances, particularly when there are thousands or millions of client devices distributed around the world, the use of multiple CDNs can improve efficiency by increasing the number of nodes available for content distribution. With multiple CDNs to choose from, proper CDN selection by a client device can be important to ensure that the client device receives content efficiently and with an effective use of system resources. For example, when a user attempts to download a new software application and the download process is inefficient (e.g., greater than just a few seconds), the user may lose patience and decide to abandon the installation, which can represent a lost opportunity for the application provider. Efficient use of CDNs can reduce user frustration by ensuring such downloads are performed as quickly as possible.

SUMMARY

Implementations of the subject matter described herein involve the development of a predictive model that allows client devices to choose an optimal CDN when multiple CDNs are available for selection. CDN performance information (e.g., response times and/or data transfer rates) can be collected by client devices and provided to a backend server application. The backend server application can use the performance information to develop the predictive model and assist client devices with CDN selection. In some examples, a client device can provide the backend server application with information related to a current state of the client device. The current state can be input into the model and the model can output a CDN selection for the client device. In this way, the model can be used to select a CDN without requiring a separate measurement or evaluation of CDN connection quality. Further, by selecting optimal CDNs for client devices, the approach is able to minimize user frustration and make it less likely that users will decide to abandon installation or use of software applications. The approach can achieve a more efficient use of system resources.

In general, one aspect of the subject matter described in this specification relates to a computer-implemented method of identifying optimal content delivery networks. The method includes: collecting performance information from each of a plurality of content delivery networks by each of a plurality of client devices; reporting the collected performance information by each of the plurality of client devices; and based on the collected performance information, mapping, by one or more computer processors, each client device to an optimal one of the plurality of content delivery networks to use for data transfer between the client device and the corresponding mapped content delivery network.

In certain examples, the collected performance information provides an indication of content delivery network performance. The indication can be or include a response time, a data transfer rate, a bandwidth, a server processing speed, a server load, or any combination thereof. Reporting the collected performance information can include reporting a state of each client device. Mapping each client device can include building a predictive model from the collected performance information. In some examples, the predictive model is built using a backend application server. Building the predictive model can include using the collected performance information as training data for a classifier.

In some implementations, mapping each client device includes running the predictive model to provide each client device with an identification of the corresponding mapped content delivery network. Running the predictive model can include running the predictive model on a backend application server and/or the plurality of client devices. Alternatively or additionally, the method can include: collecting updated performance information from each of the plurality of content delivery networks by each of the plurality of client devices; and adjusting the predictive model using the updated performance information.

In another aspect, the subject matter described in this specification relates to a system that includes a plurality of client devices and a plurality of content delivery networks in communication with the plurality of client devices. Each of the plurality of client devices collects performance information from each of the plurality of content delivery networks and reports the collected performance information. Based on the collected performance information, each client device is mapped to an optimal one of the plurality of content delivery networks to use for data transfer between the client device and the corresponding mapped content delivery network.

In various examples, the collected performance information provides an indication of content delivery network performance. The indication can be or include a response time, a data transfer rate, a bandwidth, a server processing speed, a server load, or any combination thereof. Each of the plurality of client devices can report a state of the client device. Alternatively or additionally, a predictive model can be built (e.g., using a backend server) from the collected performance information to map each client device. The predictive model can be built using the collected performance information as training data for a classifier. In some implementations, the predictive model is run to provide each client device with an identification of the corresponding mapped content delivery network. The predictive model can be run on a backend application server and/or the plurality of client devices.

In another aspect, the subject matter described in this specification relates to an article. The article includes a non-transitory computer-readable medium having instructions stored thereon that, when executed by one or more computer processors, cause the computer processors to:

collect performance information from each of a plurality of content delivery networks by each of a plurality of client devices; report the collected performance information by each of the plurality of client devices; and based on the collected performance information, map each client device to an optimal one of the plurality of content delivery networks to use for data transfer between the client device and the corresponding mapped content delivery network.

Elements of examples or embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

In general, multiple CDNs can be made available for providing content to client devices. Proper selection of CDNs by client devices is important to ensure that each client device receives the content in an efficient or optimal manner. For example, when a client device has access to two CDNs, it is generally preferable for the client device to select the CDN that is closest geographically to the client device or that is otherwise able to provide content most efficiently to the client device (e.g., due to a faster connection, fewer network hops, a faster processor, or the like). In various examples, the systems and methods described herein can be used to select optimal CDNs for client devices. The content provided by the CDNs can be or include, for example, one or more computer files, software, software updates, data, images, videos, audio files, text, etc. The content can be processed or otherwise used by one or more applications running on the client device, such as a web browser, a game, a video player, a music player, etc.

Figure 1:
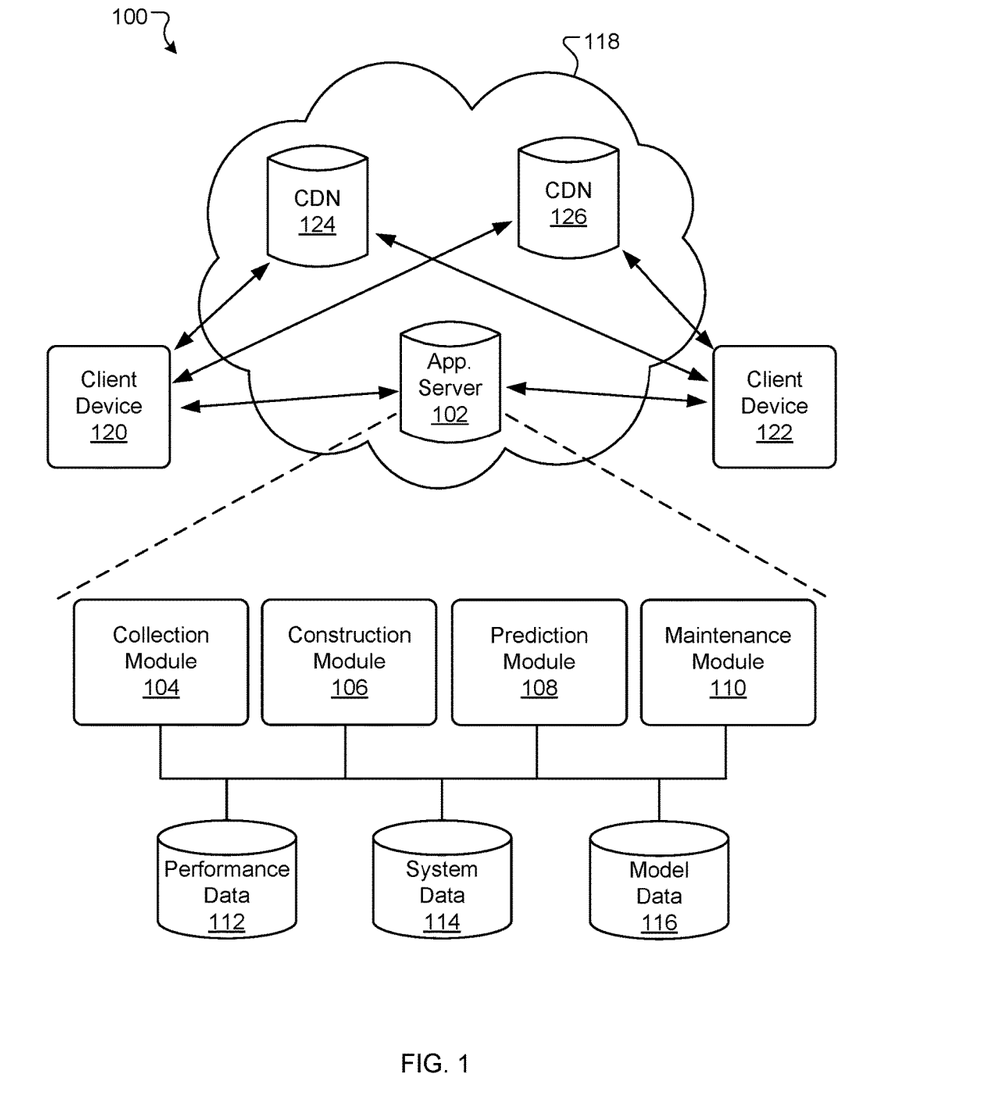
FIG. 1 is a schematic diagram of an example system for using CDNs to provide content to client devices.

FIG. 1 illustrates an example system 100 for choosing and using CDNs to provide content to client devices. A backend application server 102 develops a predictive model that is used to map client devices to CDNs. The backend application server 102 includes software components and databases that can be deployed at one or more data centers in one or more geographical locations, for example. The backend application server 102 software components can include a collection module 104, a construction module 106, a prediction module 108, and a maintenance module 110. The software components can include subcomponents that can execute on the same or on different individual data processing apparatus. The backend application server 102 databases can include performance data 112, system data 114, and model data 116. The databases can reside in one or more physical storage systems. The software components and data will be further described below.

An application, such as, for example, a web-based application, can be provided as an end-user application to allow users to interact with the backend application server 102. The end-user application can be accessed through a network 118 (e.g., the Internet) by users of a first client device 120 and a second client device 122. The first and second client devices 120 and 122 can be or include, for example, one or more personal computers, smart phones, tablet computers, and/or laptop computers. Other types of client devices are possible. The first and second client devices 120 and 122 are in communication with a first CDN 124, a second CDN 126, and the backend application server 102. The system 100 can include any number of additional client devices and/or CDNs.

In alternative examples, the performance data 112, system data 114, model data 116, or any portions thereof, can be stored on one or more client devices. Additionally or alternatively, software components for the system 100 (e.g., the collection module 104, the construction module 106, the prediction module 108, and the maintenance module 110) or any portions thereof can reside on or be used to perform operations on one or more client devices.

FIG. 1 depicts the collection module 104, the construction module 106, the prediction module 108, and the maintenance module 110 as being able to communicate with the databases (e.g., performance data 112, system data 114, and model data 116). The performance data 112 database generally includes data relating to the ability of CDNs to provide content to client devices. The performance data 112 database can include, for example, information related to a connection between a client device and a CDN (e.g., latency or a number of hops). Additionally or alternatively, the performance data 112 database can include information related to a processing performance of a CDN and/or one or more servers in the CDN. The system data 114 database generally includes data related to the client devices and CDNs that form part of the system 100. The system data 114 database can include, for example, information related to the client devices' current or previous states and/or CDN performance information. The model data 116 database generally includes data related to a predictive model for assisting client devices with the selection of CDNs. The model data 116 database can include, for example, training data for a classifier, regression data (e.g., curve-fit parameters) for a regression model, and/or statistics related to the development, usage, and maintenance of the predictive model.

In certain examples, the system 100 can be used to provide content updates to one or more applications installed or being used on the first and second client devices 120 and 122. The backend application server 102 can host an application model and/or logic for interacting with or otherwise using the applications. Users of the first and second client devices 120 and 122 can interact with the applications and/or the backend application server 102 through the network 118.

In various instances, the systems and methods described herein involve the development and maintenance of a predictive model for selecting CDNs. In a first phase, the collection module 104 can be used to collect performance information for connections between client devices and CDNs. The performance information can then be used in a second phase by the construction module 106 to build the predictive model. In a third phase, the prediction module 108 can run the predictive model to select CDNs for the client devices. Finally, in a fourth phase, the maintenance module 110 can be used to refine or adjust the predictive model as needed, e.g., based on additional performance information and/or evaluations of model predictions. Each of these phases is described in detail below.

To collect the performance information, the collection module 104 is generally configured to determine properties of connections, and related parameters, between client devices and available CDNs. The connection properties and related parameters can include, for example, client device parameters and CDN performance parameters. In general, the client device parameters can relate to client devices (e.g., a current or previous state of a client device), while the CDN performance parameters can provide an indication of CDN performance. The client device parameters and the CDN performance parameters can be collected by client devices, reported to the collection module 104, and/or delivered to the construction module 106, which can use the parameters to build the predictive model. Once the predictive model has been built, the model can receive client device parameters from a client device as input and provide one or more CDN performance parameters as output. The model output can be used to select a CDN for the client device.

In various examples, the client device parameters can be or include parameters relating to a current state of a client device and/or a current state of the world. The client device parameters can include, for example, one or more of the following: a time of day, a date, a type of client device (e.g., a specific smartphone model and/or manufacturer), a geographic location of a client device, a connection type for a client device (e.g., Wi-Fi or cellular), and/or a network provider (e.g., an Internet provider, such as COMCAST) for a client device. Other types of client device parameters are possible. In some implementations, the client device parameters can include one or more specific parameters that can be static for each individual client device but can vary across multiple client devices. For example, each type of client device (e.g., a specific model or manufacturer) can have its own set of networking hardware, which can influence CDN selection. Some types of client devices, for example, can perform better with certain CDN providers, depending on how the CDNs are configured to send data and/or due to internal hardware buffer sizes on the client devices. In various examples, the collection module 104 can obtain client device parameters from the client devices (e.g., the client devices 120 and 122), as needed (e.g., from the operating system), along with any CDN performance parameters.

In various examples, the CDN performance parameters provide an indication of the performance of one or more available CDNs. The CDN performance parameters can include, for example, one or more of the following: a response time (e.g., latency or round-trip time), a data transfer rate (e.g., in Mbps), a bandwidth, and/or one or more other scores or values that can provide a predicted or measured indication of CDN performance. Other types of CDN performance parameters are possible. Response times, data transfer rates, and/or bandwidth values can generally be obtained through direct measurements. For example, to measure a response time for a connection, the collection module 104 can instruct a client device (e.g., the first client device 120) to send a request to a CDN (e.g., the first CDN 124) and determine how long it takes to receive a response from the CDN. The CDN performance parameters or a portion thereof can be obtained by the client devices (e.g., the first client device 120) and sent to the collection module 104 on the backend application server 102.

In various implementations, it can be difficult to predict the influence that an individual client device parameter can have on the selection of an optimal CDN. For example, when a client device is in Seoul, South Korea on a cell connection provided by a local phone company (e.g., SK TELECOM), the fastest available CDN may be provided by the local phone company. On the other hand, when a client device is in Busan, South Korea on a Wi-Fi connection, it might be better to select a CDN from a different provider (e.g., AKAMAI). Without developing and using the predictive model described herein, however, such predictions can be difficult. Accordingly, when collecting performance information and building the model, it is generally preferable to include a wide variety of performance information (e.g., client device parameters and CDN performance parameters), so that the model can take all such parameters into consideration. In various examples, CDN selection may be most sensitive to specific client device parameters, such as geographic location, network (Internet) provider, connection type, and client device type. CDN selection may be relatively insensitive to certain other parameters, such as time of day and/or date.

In some instances, a client device can obtain the performance information during a content update. For example, after the first client device 120 and/or backend application server 102 determine that it is time for a content update, the backend application server 102 can provide the first client device 120 with a listing of available CDNs. The first client device 120 can then submit a first data request to all available CDNs simultaneously and the first CDN 124 to respond with the data can be chosen for all subsequent requests. Alternatively or additionally, the first client device 120 can submit the first data request to each CDN sequentially and choose the CDN with the fastest response time for all subsequent requests. After the content update, the performance information and client state can be reported to the backend application server 102, for example, for storage in performance data 112 database and/or system data 114 database.

In other examples, a client device (e.g., the first client device 120) can obtain the performance information outside the context of a content update by sending a lightweight request or beacon to all available CDNs. The beacon can be any suitable lightweight request, such as, for example, a simple echo request (similar to PING, a network utility) or an HTTP HEAD request. To collect sufficient data, this beaconing can be triggered by the first client device 120 detecting a change in state, for example, caused by the first client device 120 moving from a Wi-Fi connection to a cell connection. In some examples, the beaconing can be triggered remotely via a request from the backend application server 102 to the client device.

In general, when a request is made to a CDN, the systems and methods described herein can have little knowledge or understanding of how the CDN processes the request. For example, an HTTP GET request can be made to a Uniform Resource Locator (URL) provided by the CDN, which can route the request to what the CDN believes is an optimal node in the CDN for providing a response. The client devices 120 and 122 and the backend application server 102 generally do not know which node is chosen by the CDN or any other details about how the CDN fulfills the request. The better the CDN is at finding optimal nodes, however, the better the CDN performance can be in aggregate and, as a result, the more often the CDN can be selected by the systems and methods described herein.

After the performance information has been collected, the construction module 106 can be used to coordinate the building of the predictive model. For example, the construction module 106 can be used to perform a regression analysis to determine relationships among variables, for example, by fitting a functional form (e.g., a linear, quadratic, or polynomial form) through measurement data (e.g., from the performance information). The outcome of the regression analysis can be one or more equations for use in the predictive model, which can be used to predict an optimal CDN for a client device based on one or more independent variables. The independent variables can be or include, for example, one or more client device parameters or other variables defining a current state of the client device and/or a state of the world (e.g., a time of day). In various implementations, the predictive model can determine one or more CDN performance parameters for a given set of client device parameters or other independent variables.

Alternatively or additionally, the construction module 106 can use the performance information to train a classifier for use in the predictive model. Possible classifiers may be or include, for example, one or more linear classifiers (e.g., Fisher's linear discriminant, logistic regression, Naive Bayes classifier, and/or perceptron), support vector machines (e.g., least squares support vector machines), quadratic classifiers, kernel estimation models (e.g., k-nearest neighbor), boosting (meta-algorithm) models, decision trees (e.g., random forests), neural networks, and/or learning vector quantization models. Other classifiers can be used. Once trained, the classifier can receive one or more input parameters as input and provide CDN performance parameters and/or a CDN selection as output. The input parameters can be or include, for example, one or more client device parameters or other variables defining a current state of the client device and/or a state of the world (e.g., a time of day).

As a simple example, the performance information may indicate that on average the first CDN 124 performs better in the United States while the second CDN 126 performs better in South Korea. When geographical location of the client devices is provided as input to the predictive model, the predictive model can choose the first CDN 124 for client devices located in or close to the United States and choose the second CDN 126 for client devices located in or close to South Korea. In some examples, when the predictive model selects or chooses a CDN for a client device, the predictive model can be considered to "map" the client device to the selected CDN.

A more complex and useful predictive model can be generated via statistical and machine learning methods, such as, for example, regression. In one example, a regression analysis can be performed to predict response times for CDNs based on a current state of a client device. The predictions can be made using one or more equations that relate CDN response time (a dependent variable) to one or more variables defining the state of the client device (e.g., geographical location and/or type of Internet connection). Additionally or alternatively, the predictive model can be developed by treating the problem as one of classification rather than regression. With the classification approach, labels can be added to the performance information, for example, such that each client state variable in the performance information can be labeled with an optimal CDN. The labeled data can be used to train a classifier that receives client states as input and provides optimal CDNs as output. Other suitable predictive models are possible. In general, data used to build or define the predictive model (e.g., regression coefficients and/or labeled training data) can be stored in model data 116 database.

Once the predictive model has been built, the prediction module 108 can coordinate use of the model to direct client devices to optimal CDNs. For example, referring to FIG. 2, the first client device 120 can send a current state to the backend application server 102. The backend application server 102 can use the client's state as input for a predictive model 202. An output from the predictive model 202, including an identification of the optimal CDN for the first client device 120, can be provided from the backend application server 102 to the first client device 120. In alternative instances, particularly when the predictive model is lightweight and does not require significant computation, the predictive model can be run on the client device. This can enable the client device to choose a CDN on its own, without having to consult with the backend application server 102.

Figure 2:
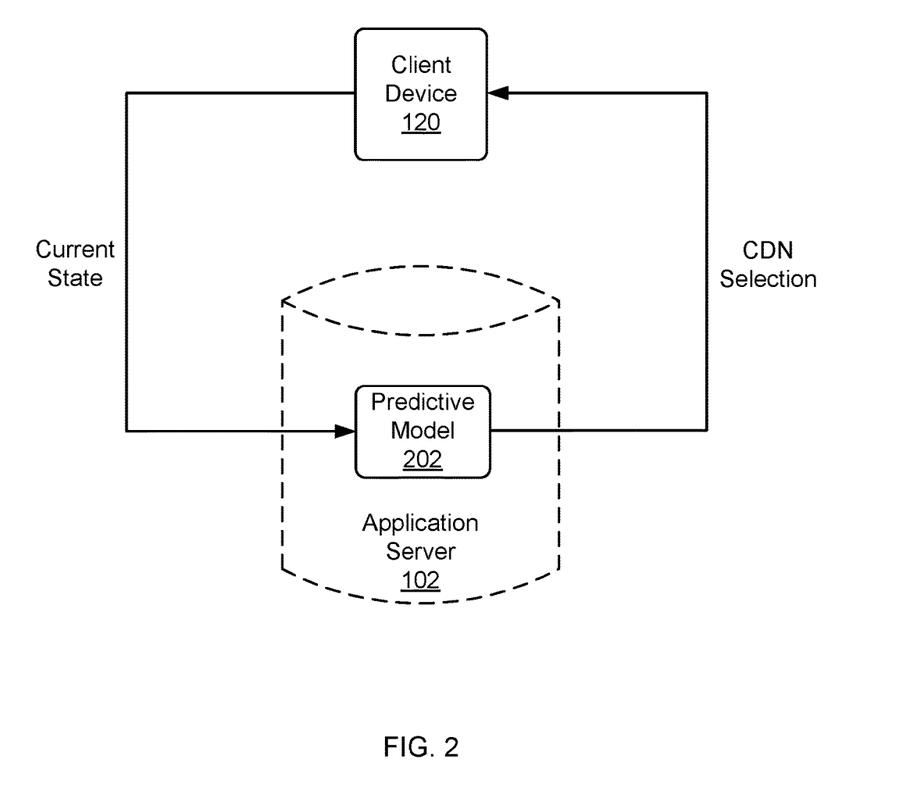
FIG. 2 is a schematic diagram of a client device interacting with a predictive model for choosing a CDN.

In various examples, output from the predictive model includes a performance score for each available CDN. The performance score for a CDN can be or include, for example, a probability that the CDN is an optimal or best choice for the respective client device. Alternatively or additionally, the performance score can be or represent a predicted performance value for the CDN, such as a predicted latency, round-trip time, data transfer rate, or any combination thereof. In general, once the performance scores are determined for the available CDNs, the CDN having the highest performance score can be selected for the client device.

After the predictive model has been built and used, the maintenance module 110 can be used to further refine and improve the model. For example, the maintenance module 110 can instruct client devices to periodically beacon or send requests to available CDNs, such that additional performance information (e.g., client device parameters and CDN performance parameters) can be collected and sent to the backend application server 102. The maintenance module 110 can use the additional performance information to further refine the predictive model. For example, the additional performance information can be used for further regression analysis and/or as additional training data for any classifiers used in the predictive model. It can be important to revise or update the predictive model to account for any changes to the system 100. For example, when a new CDN becomes available or a CDN is removed, it is generally preferable to update the model accordingly, so that accurate CDN selections can be made going forward.

Figure 3:
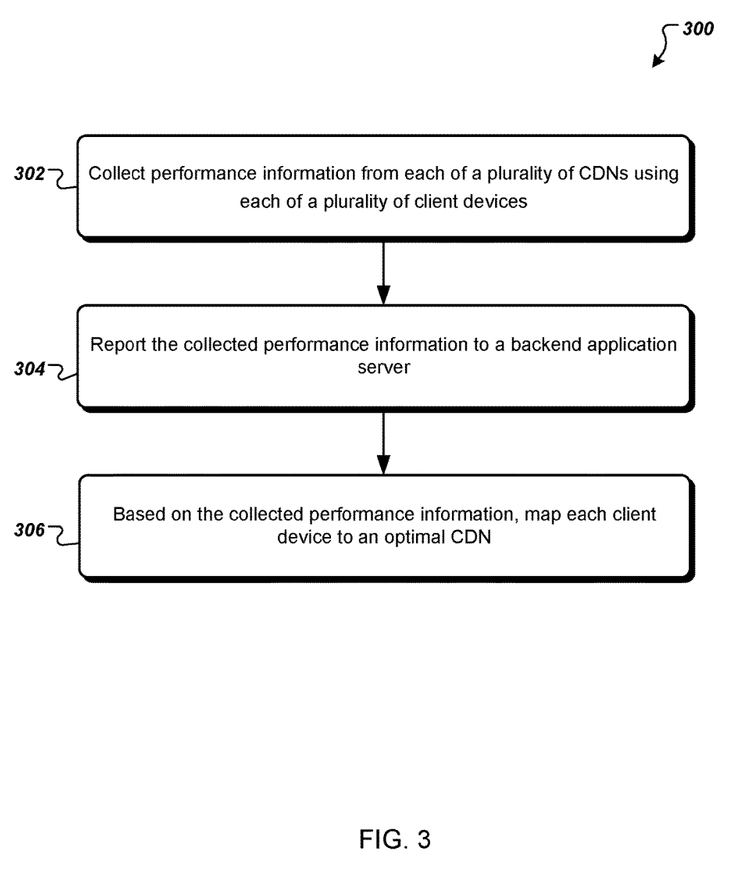
FIG. 3 is a flowchart of an example method of identifying optimal CDNs.

FIG. 3 is a flowchart of an example method 300 of identifying optimal CDNs for a plurality of client devices. Performance information is collected (step 302) from each of a plurality of CDNs by each of a plurality of client devices. The collected performance information is reported (step 304) to, for example, a backend application server by each of the plurality of client devices. Based on the collected performance information, each client device is mapped (e.g., using a predictive model; step 306) to an optimal one of the plurality of CDNs to use for data transfer between the client device and the corresponding mapped CDN.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of identifying optimal content delivery networks, the method comprising:
    collecting performance information from each of a plurality of content delivery networks by each of a plurality of client devices;
    reporting the collected performance information by each of the plurality of client devices;
    based on the collected performance information, mapping, by one or more computer processors, each client device to an optimal one of the plurality of content delivery networks to use for data transfer between the client device and the corresponding mapped content delivery network,
        wherein mapping each client device comprises running a predictive model to provide the client device with an identification of the corresponding mapped content delivery network; and
    for each client device, using the corresponding mapped content delivery network to transfer data between the client device and the corresponding mapped content delivery network.

2. The method of claim 1, wherein the collected performance information provides an indication of content delivery network performance.

3. The method of claim 2, wherein the indication comprises at least one of a response time, a data transfer rate, a bandwidth, a server processing speed, and a server load.

4. The method of claim 1, wherein reporting the collected performance information comprises:
    reporting a state of each client device.

5. The method of claim 1, wherein mapping each client device comprises:
    building the predictive model from the collected performance information.

6. The method of claim 5, wherein the predictive model is built using a backend application server.

7. The method of claim 5, wherein building the predictive model comprises:
    using the collected performance information as training data for a classifier.

8. The method of claim 1, wherein running the predictive model comprises:
    running the predictive model on at least one of a backend application server and the plurality of client devices.

9. The method of claim 5, comprising:
    collecting updated performance information from each of the plurality of content delivery networks by each of the plurality of client devices; and
    adjusting the predictive model using the updated performance information.

10. A system, comprising:
    a plurality of client devices; and
    a plurality of content delivery networks in communication with the plurality of client devices,
        wherein each of the plurality of client devices collects performance information from each of the plurality of content delivery networks,
        wherein each of the plurality of client devices reports the collected performance information,
        wherein, based on the collected performance information, each client device is mapped to an optimal one of the plurality of content delivery networks to use for data transfer between the client device and the corresponding mapped content delivery network,
        wherein, to map each client device, a predictive model is run to provide the client device with an identification of the corresponding mapped content delivery network, and
        wherein, for each client device, the corresponding mapped content delivery network is used to transfer data between the client device and the corresponding mapped content delivery network.

11. The system of claim 10, wherein the collected performance information provides an indication of content delivery network performance.

12. The system of claim 11, wherein the indication comprises at least one of a response time, a data transfer rate, a bandwidth, a server processing speed, and a server load.

13. The system of claim 10, wherein each of the plurality of client devices reports a state of the client device.

14. The system of claim 10, wherein the predictive model is built from the collected performance information to map each client device.

15. The system of claim 14, wherein the predictive model is built using a backend application server.

16. The system of claim 14, wherein the predictive model is built using the collected performance information as training data for a classifier.

17. The system of claim 10, wherein the predictive model is run on at least one of a backend application server and the plurality of client devices.

18. An article, comprising:
- a non-transitory computer-readable medium having instructions stored thereon that, when executed by one or more computer processors, cause the computer processors to:
    collect performance information from each of a plurality of content delivery networks by each of a plurality of client devices;
    report the collected performance information by each of the plurality of client devices;
    based on the collected performance information, map each client device to an optimal one of the plurality of content delivery networks to use for data transfer between the client device and the corresponding mapped content delivery network,
        wherein, to map each client device, a predictive model is run to provide the client device with an identification of the corresponding mapped content delivery network; and
    for each client device, use the corresponding mapped content delivery network to transfer data between the client device and the corresponding mapped content delivery network.

* * * * *